Aug. 25, 1964 R. A. WOLFF 3,146,390

REMOTE CONTROL SYSTEM

Filed Jan. 26, 1961 2 Sheets-Sheet 1

INVENTOR.
Robert A. Wolff
BY James T. Barr
ATTY.

INVENTOR.
Robert A. Wolff
BY
James T. Barr
ATTY.

United States Patent Office 3,146,390

Patented Aug. 25, 1964

3,146,390

REMOTE CONTROL SYSTEM

Robert A. Wolff, La Grange Park, Ill., assignor to Admiral Corporation, Chicago, Ill., a corporation of Delaware Filed Jan. 26, 1961, Ser. No. 85,029

6 Claims. (Cl. 318—266)

This invention relates in general to remote control systems and in particular to an improved remote control system that is wholly transistorized and contains no relays.

The term remote control has been subdivided to differentiate between those systems employing some type of direct connection between the control station and receiving station and those systems which do not require any direct connection therebetween. The former are known as wired remote control systems and the latter as wireless remote control systems. In particular such systems have become increasingly popular for the remote control of radio receiving apparatus, such as television receivers. In such use many types of control energy have been employed, but those systems employing ultrasonic control signals have received the most favorable reception by the viewing public.

While the invention will be described in the environment of a remote control system for a television receiver, it should be understood that this is for purposes of illustration only and is not to be construed as a limitation of the invention to such an environment.

In the remote control of television receivers, it is desirable to provide for remotely controlling at least three functions, namely on-off, volume and station tuning. It has been present practice to put the on-off and volume functions on a sequential basis and hence use only two control signals and control functions. For a complete disclosure of a system incorporating an on-off function, a volume control function and a station tuning function, see the copending application of Meyer Marks, Serial No. 812,441, filed May 11, 1959.

In providing for the remote control of the on-off function in the television receiver, it is also highly desirable to have the remote receiving station continuously energized at all times. Thus it becomes imperative to provide a remote receiving unit which has very low stand-by power consumption. Transistorized circuitry is ideal for this purpose and such units are already known in the art.

In ultrasonic remote control systems known in the art each function to be performed has, in general, a different control signal associated with it. The difference is usually based upon the frequency of the control signal and frequency responsive means are employed in the receiving unit to determine which control signal has been transmitted. Obviously, separate signal translation channels may be used, one for each control signal, and the outputs thereof individually connected to operate a control device such as a relay. For economy however, it is best to provide a common signal translation channel for translating both control signals, and to terminate this common translation channel in some sort of segregating network which is capable of separating the control signals on the basis of frequency. Segregated signals are then used to energize a control device.

In all of these prior art remote control systems a relay of some type is actuated upon translation of its associated control signal. A transistorized ultrasonic remote control receiving system utilizing a novel relay structure is fully disclosed in a copending application of Reuben C. Carlson et al., Serial No. 36,223, filed June 15, 1960, now United States Patent Number 3,027,497.

In all such remote control systems it is essential to provide noise immunity to prevent unwanted operation of the controlled apparatus due to noise. In the copending application referred to above, the novel relay structure is utilized to provide noise immunity in the sense that spurious signals are mechanically counterbalanced. The system of the present invention utilizes a bi-directional direct current motor which is driven directly from the output transistors in the individual translation channels. As will be more fully described hereinafter, the inertia of the motor and the particular arrangement of the output circuits provides excellent noise immunity in that, if more than one signal translation channel is energized, the output currents produced thereby tend to cancel in the motor load.

Accordingly it is a principal object of this invention to provide an improved remote control system.

A further object of this invention is to provide a remote control system which does not require the use of relays of any type.

Another object of this invention is to provide a transistorized remote control system incorporating a small bi-directional direct current motor as the output load.

A still further object of this invention is to provide a remote control unit which is much more economical to manufacture than similar units performing similar functions.

Still another object of this invention is to provide a transistorized remote control unit incorporating as a load thereof, a bi-directional direct current motor, in which one control function is selected by driving the motor in one of its two directions of rotation and the other control function is selected by driving the motor in the other of its directions of rotation.

Other objects of this invention will become apparent upon reading of the following specification in conjunction with the drawings in which.

Figure 1:
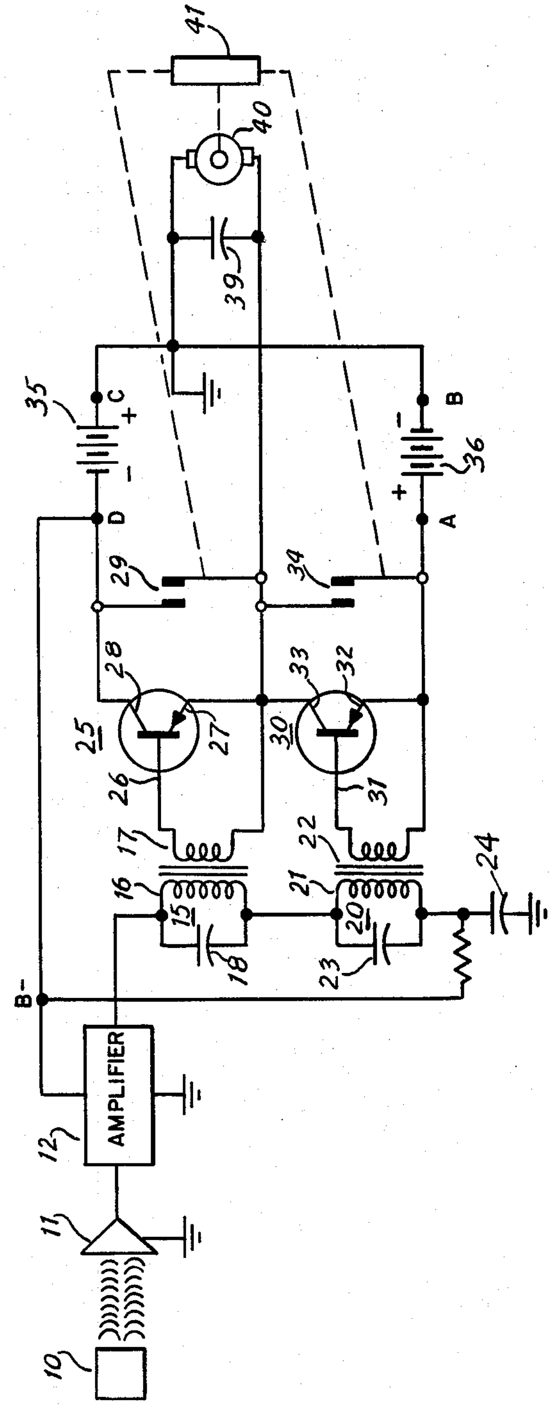
FIG. 1 is a partial block and partial schematic diagram of a remote control system embodying the invention.

Referring now to FIG. 1, there is shown a source 10 of at least two different ultrasonic remote control signals. For purposes of this description it will be assumed that these two signals differ in frequency only. At the receiving unit a microphone 11 receives the transmitted signals from transmitter 10, converts them to corresponding electrical signals and thence they are coupled to an amplifier 12. Amplifier 12 is shown in block form and may be of any conventional type, but preferably is one employing transistors throughout.

The output of amplifier 12 is fed to a serially connected pair of tuned circuits 15 and 20. Tuned circuit 15 comprises a primary winding 17 of a transformer and a parallelly connected capacitor 18. Tunnel circuit 20 similarly comprises a primary winding 21 of another transformer and a parallelly connected capacitor 23. Tuned circuit 15 is tuned to the frequency of one of the control signals producible by transmitter 10 and tuned circuit 20 is tuned to the frequency of the other of these control signals. A source of potential B— is coupled to the junction of the bottom of tuned circuit 20 and an RC decoupling network. Capacitor 24 provides good bypassing for signal frequencies and the tuned circuits can therefore be considered to be at ground potential, for alternating current purposes.

Transistor 25, having a base electrode 26, an emitter electrode 27 and a collector electrode 28 is arranged with its base-emitter circuit connected to secondary winding 17, which in turn is coupled to tuned circuit 15. Transistor 30, having a base electrode 31, an emitter electrode 32 and a collector electrode 33 is arranged with its base emitter-circuit connected to secondary winding 22, which in turn is coupled to tuned circuit 20. Thus signals in the respective tuned circuits give rise to input signals in the input circuits of the corresponding transistors.

Collector 28 of transistor 25 is connected to the negative terminal D of a battery 35. Emitter terminal 32 of transistor 30 is connected to the positive terminal A of a battery 36. The positive terminal C of battery 35 is connected to the negative terminal B of battery 36. The junction of terminals B and C is grounded, as is one terminal of a direct current bi-directional motor 40. Emitter 27 of transistor 25 is connected to collector 33 of transistor 30 and this junction is connected to the other terminal of motor 40. A capacitor 39 is connected across the motor terminal to provide a bypass for signal currents.

Motor 40 is coupled to a block 41 which contains the necessary apparatus (not shown) for utilizing the rotational motion of motor 40 to perform the desired function. The apparatus in block 41 may for example contain mechanical structure for driving a television tuner between preselected station tuning positions responsive to one direction of rotation of motor 40 and for driving a television volume on-off control responsive to rotation in the other direction. Apparatus suitable for such a purpose is fully disclosed in a copending application of Reuben Carlson and Ray Schrecongost, Serial No. 88,564, filed February 10, 1961.

A pair of contacts 29 and 34 are respectively bridged across the collector and emitter of transistor 25 and the collector and emitter of transistor 30. These contacts are operated via the apparatus in block 41 as indicated by the dashed line joining these components. Details of their operation will be given below in connection with the functional description of the apparatus of FIG. 1.

Assume that transmitter 10 emits a first control signal. This signal is preferably one of limited duration in the system being described, although the invention, with appropriate changes in block 41, will work equally well with signals of sustained, controllable duration. Microphone 11 receives the transmitted signal which is subsequently amplified in amplifier 12. Assuming the frequency of the transmitted control signal corresponds to the frequency of tuned circuit 15, a substantial voltage will be developed across this tuned circuit whereas practically no voltage will be developed across tuned circuit 20. The voltage across tuned circuit 15 is coupled by secondary winding 17 to the base-emitter circuit of transistor 25. As the transistors shown are of the PNP type, their bases must be negative with respect to their emitters for conduction to occur. For positive excursions of the signal, that is for excursions which drive base 26 positive with respect to emitter 27, transistor 25 is cut off. For negative excursions of the signal however, transistor 25 is driven conductive in its base-emitter circuit, which by transistor action gives rise to a large conduction current in its emitter-collector circuit.

For purposes of description, the emitter-collector circuit of the transistor may be considered to be a variable resistance. Its resistance is very high when the transistor is cut off and progressively decreases as the transistor is driven more conductive in its base-emitter circuit. Assuming that the input signal is large enough to cause substantial reduction in the collector-emitter resistance of transistor 25, a current will flow in one direction through motor 40 as follows: Positive current flow proceeds from terminal C of battery 35, to the upper terminal of motor 40, through motor 40, to emitter 27 of transistor 25, through collector 28 of transistor 25 and back to negative terminal D of battery 35. Thus an energizing circuit for motor 40 is completed and motor 40 becomes operative. Since a large portion of the current flow in the output circuit is alternating at the frequency of the input signal, a capacitor 39 is incorporated and provides signal frequency bypassing for motor 40. Motor 40 upon operation drives the apparatus (not shown) in block 41 which causes closure of contacts 29. Contacts 29 in closing establish a direct connection from battery 35 to motor 40 for operation of motor 40 independent of the continued presence of the control signal. Thereafter the apparatus in block 41 causes opening of contacts 29 and interruption of the operating path for motor 40 at a predetermined position. (It is assumed that the control signal has subsided before the predetermined position is reached.)

The circuit as described is intended for use with control signals of limited duration. For control signals of sustained, controllable duration contacts 29 and the associated apparatus in block 41 would not be necessary, since motor 40 will be energized as long as the control signal is present at the input circuit of transistor 25.

Similarly, responsive to transmission of the second control signal from transmitter 10, tuned circuit 20 will be energized and transistor 30 will be driven conductive in its base-emitter circuit. This will give rise to current flow through motor 40 in the opposite direction and will result in reverse rotation thereof. The apparatus in block 41 is now effective to close contacts 34, thus directly connecting battery 36 to motor 40 and enabling motor 40 to continue rotating until the next predetermined position is reached.

It is apparent from FIG. 1 that both the upper translation channel, containing transistor 25, and the lower translation channel, containing transistor 30, have the same load circuit, comprising motor 40 and capacitor 39. It may also be noted that, barring complete overload of amplifier 12, both tuned circuits may be energized simultaneously if signals corresponding to the frequencies of the control signals are present simultaneously. If such a situation occurs, as often happens with noise, then both transistors are driven conductive and the individual output load currents traverse motor 40 in opposite directions, thus tending to nullify each other. As a result motor 40 remains stationary. Additional noise immunity is obtained because of the inertia of motor 40 which requires a relatively large difference in amplitude between two simultaneously received noise signals of the proper frequencies. This effect is highly desirable in any remote control system and is absolutely indispensable in a remote control system which is designed to be continuously energized for standby operation. If the remote control system does not have good noise immunity, it may be falsely actuated by spurious noise signals in the vicinity of the receiver.

One of the characteristics of noise is that it contains many frequencies. Since the frequencies of the two control signals are fairly close together, the probability of spurious noise signals containing both frequencies at substantially equal average amplitudes is very good. As has been just described, if such is the case, both translation channels will be energized and their output currents will tend to cancel in the load.

To recapitulate, the circuit of the invention has exceptionally good noise immunity due to: The natural inertia of the motor, and the connection of the bi-directional motor as a common load for the individual control channels.

Figure 2:
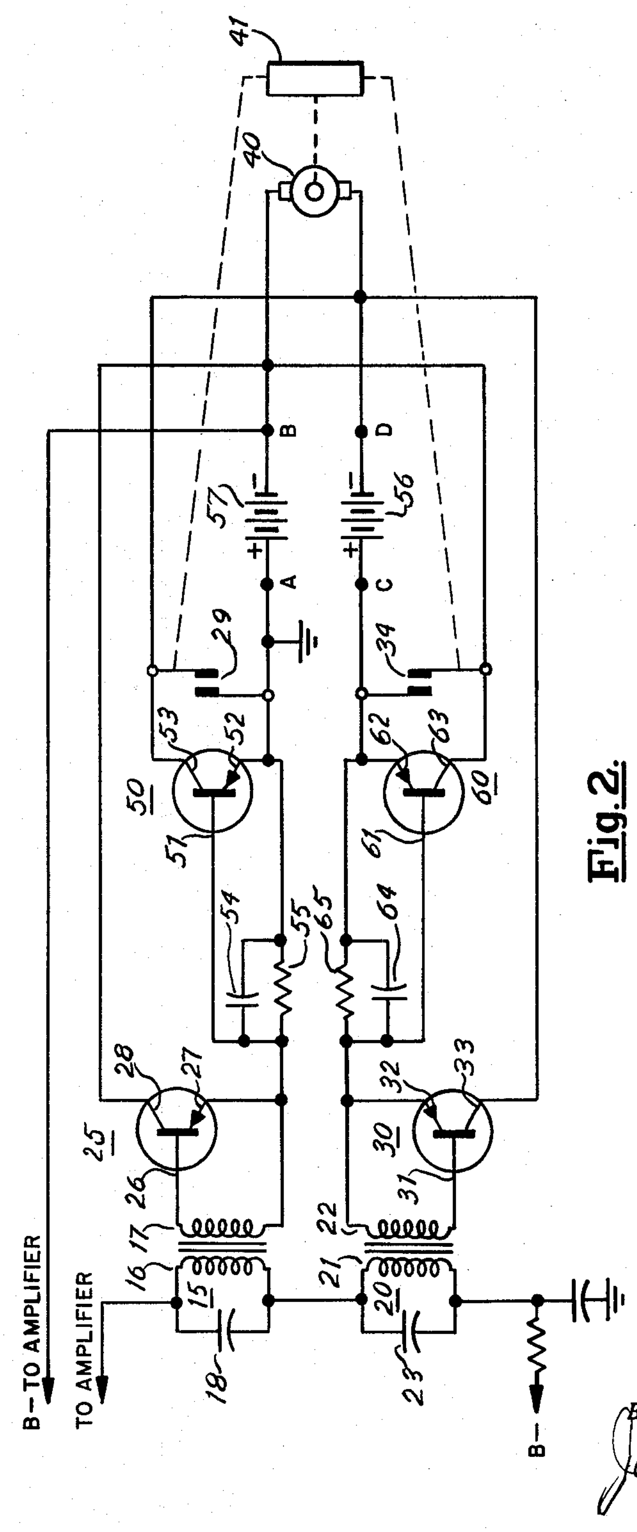
FIG. 2 is a schematic diagram of a portion of the remote control system of FIG. 1 showing a modified form of the invention.

FIG. 2 shows a modified form of the invention disclosed in FIG. 1. This embodiment utilizes a pair of additional transistors 50 and 60 and motor 40 is connected as a common load for the individual output circuits thereof. Transistors 50 and 60 are driven by transistors 25 and 30 and, thus it may be readily seen that larger power outputs are available from this circuit. In the alternative, of course, similar power output may be realized with a smaller input amplifier gain.

As in FIG. 1, a control signal is transmitted, received, and amplified and appears across either of tuned circuits 15 or 20. Assuming that a control signal having the frequency corresponding to the tuned frequency of tuned circuit 15 is received, input winding 17 is energized and drives the base-emitter circuit of transistor 25 conductive in the same manner as that described with reference to FIG. 1. Conduction in the input circuit of transistor 25 gives rise to conduction in the output circuit thereof along a path as follows: From positive terminal A of battery 57, through the parallel combination of resistor 55 and capacitor 54, through emitter 27 of transistor 25, through collector 28 of transistor 25, and to negative terminal B of battery 57. In this circuit resistor 55 comprises a load for transistor 25 and capacitor 54 is effective to bypass the alternating current component of the signal. Thus at the junction of emitter 27, capacitor 54 and resistor 55 a substantially direct current voltage is developed which varies in accordance with the signal level input to transistor 25. The polarity of this direct current potential is negative, which is the proper direction for driving the input circuit of transistor 50 conductive. As resistor 55 is connected in the base-emitter circuit of transistor 50, further amplification occurs and a large current flows from emitter 52 to collector 53. Transistor 50 is essentially a direct current amplifier, since the alternating current components of the signal have been bypassed by capacitor 54, and hence, motor 40 may be connected in the output circuit thereof without requiring a large bypass capacitor.

Upon conduction in the output circuit of transistor 50, motor 40 is energized from positive terminal A of battery 57, through the emitter-collector junction of transistor 50, through the lower terminal of motor 40 and back to the negative terminal B of battery 57. The shaft of motor 40 is coupled to block 41, which contains apparatus similar to that in block 41 of FIG. 1 and which performs substantially the same functions with regard to contacts 29 and contacts 34.

The circuit operates in a similar manner upon receipt of a control signal of the frequency to which tuned circuit 20 is tuned. In this case, transistor 30 is driven conductive and develops a potential across resistor 65 and capacitor 64, which potential is applied to base 61 of transistor 60. The output circuit of transistor 60 is driven conductive and results in energization of motor 40 in the opposite direction. This path is from positive terminal C of battery 56, through emitter 62 and collector 63 of transistor 60, through motor 40, and to terminal D of battery 56. It should also be noted that the noise immunity features of the circuit of FIG. 1 are also present in the circuit of FIG. 2.

Figure 3:
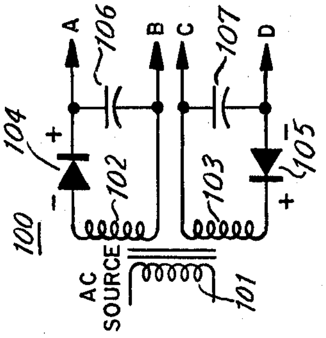
FIG. 3 is a schematic diagram of an alternate power supply which may be employed in lieu of the batteries shown in FIGS. 1 and 2.

In both FIGS. 1 and 2, one of the battery sources is utilized to supply operating potentials to amplifier 12, which preferably is completely transistorized. In FIG. 3 an alternative form of power supply for the circuits of FIGS. 1 and 2 is shown. In normal use of this remote control system, in a television receiver for instance, the power supply of FIG. 3 is to be preferred over the batteries shown in FIGS. 1 and 2. The power supply of FIG. 3 is conventional and includes a transformer 100 having a primary winding connected to an alternating current source. Transformer 100 has a pair of secondary windings 102 and 103 which feed respective half-wave rectifiers. Rectifier 104 is coupled to winding 102 and is connected to filter capacitor 106. Terminal A is connected to the positive side and terminal B to the negative side of capacitor 106. Similarly a rectifier 105, oppositely poled from that of rectifier 104 is connected to winding 103 and feeds filter capacitor 107. Terminal C is connected to the positive terminal and terminal D to the negative terminal of this capacitor.

To utilize the power supply of FIG. 3 in the circuit of FIG. 1 or FIG. 2, it is merely necessary to disconnect the individual batteries shown and connect the terminals of the power supply of FIG. 3 to the correspondingly marked terminals in the individual circuit.

In the description of this invention transistors of the PNP type have been used throughout. However it should be obvious to those skilled in the art that transistors of the NPN type may be substituted therefor with corresponding changes in the supply voltage polarities. It should also be obvious to those skilled in the art that numerous modifications in the circuitry herein may be made without departing from the true spirit and scope of the invention as defined in the following claims.

What is claimed is:

1. In combination in a control system adapted to energize a bidirectional direct current motor for clockwise rotation responsive to receipt of a first control signal and for counter-clockwise rotation responsive to receipt of a second control signal; a signal translation channel capable of receiving and translating both said control signals; a first and a second transistor each having an input and an output circuit; discriminating means coupled between said signal translation channel and said input circuits, said discriminating means energizing the input circuit of said first transistor responsive to receipt of said first control signal and energizing the input circuit of said second transistor responsive to receipt of said second control signal; a power supply having a positive polarity terminal, a negative polarity terminal and a common terminal; one of said output circuits connected between said positive polarity terminal and said common terminal; the other of said output circuits connected between said common terminal and said negative polarity terminal; both said output circuits including said motor; said output circuits being driven conductive responsive to energization of corresponding ones of said input circuits whereby said motor is energized for rotation in a direction dependent upon the control signal received.

2. In combination; a direct current bi-directional motor; a direct current power supply having a first, a second and a third terminal; a first transistor and a second transistor, each of said transistors having a base electrode, an emitter electrode and a collector electrode; a first signal input circuit and a second signal input circuit individually connected between the base and emitter of said first and said second transistors, respectively; a connection between the collector electrode of said first transistor and said first terminal; a connection between the emitter electrode of said second transistor and said third terminal; the emitter electrode of said first transistor being joined to the collector electrode of said second transistor; said motor being connected between the emitter electrode of said first transistor and said second terminal; said transistors being driven conductive along their emitter collector paths responsive to control signals being introduced into said input circuits; said motor being energized for rotation in one direction upon conduction in the emitter collector path of said first transistor and being energized for rotation in a direction opposite to said one direction responsive to conduction in the emitter collector path of said second transistor; and means for selectively introducing a control signal to said first and said second input circuits.

3. The control system as set forth in claim 2 wherein said means for selectively introducing a control signal comprises signal translation means capable of translating at least a first control signal and a second control signal and segregating means for introducing said first control signal into said first input circuit and said second control signal into said second input circuit.

4. The control system as set forth in claim 3 wherein said first control signal and said second control signal are of different predetermined ultrasonic frequencies and wherein a capacitor is connected in parallel with said motor, said capacitor being chosen to provide negligible impedance at said frequencies.

5. In combination; a signal translation channel adapted to receive and translate at least two different ultrasonic control signals; means coupled to said signal translation channel for segregating said different control signals; a pair of transistors each having an input circuit and an output circuit; means coupling said segregating means to said input circuits whereby said first input circuit is energized responsive to receipt of said first control signal and said second input circuit is energized responsive to receipt of said second control signal; a power supply having a positive terminal and a negative terminal; a bi-directional direct current motor connected as a common load for both said output circuits; one of said output circuits being connected to said positive terminal and the other of said output circuits being connected to said negative terminal; whereby upon receipt of said first control signal, said first transistor is driven conductive in its output circuit to cause energization of said motor for rotation in one direction and upon receipt of said second control signal said second transistor is driven conductive in its output circuit to cause energization of said motor for rotation in an opposite direction.

6. The combination set forth in claim 5 including means for selectively shorting the output circuit of the conductive one of said transistors, said means being activated by operation of the motor.

References Cited in the file of this patent

UNITED STATES PATENTS

| | | |
|---|---|---|
| 2,461,956 | Beckwith | Feb. 15, 1949 |
| 2,472,736 | Waterman | June 7, 1949 |
| 2,871,463 | Beckwith | Jan. 27, 1959 |
| 2,875,391 | Brannan | Feb. 24, 1959 |